United States Patent
Mao et al.

(10) Patent No.: US 10,220,412 B2
(45) Date of Patent: Mar. 5, 2019

(54) VIBRATION MOTOR

(71) Applicants: Lubin Mao, Shenzhen (CN); Fei Hou, Shenzhen (CN)

(72) Inventors: Lubin Mao, Shenzhen (CN); Fei Hou, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 392 days.

(21) Appl. No.: 15/297,494

(22) Filed: Oct. 19, 2016

(65) Prior Publication Data

US 2017/0144191 A1 May 25, 2017

(30) Foreign Application Priority Data

Nov. 20, 2015 (CN) .................... 2015 2 0940457 U
Jun. 24, 2016 (JP) .................... 2016-126070

(51) Int. Cl.
H02K 41/02 (2006.01)
B06B 1/04 (2006.01)
H02K 33/16 (2006.01)

(52) U.S. Cl.
CPC ............ *B06B 1/045* (2013.01); *H02K 33/16* (2013.01); *H02K 2201/18* (2013.01)

(58) Field of Classification Search
CPC ....................................................... H02K 33/00
USPC ............................................ 310/12.02–12.15
See application file for complete search history.

(56) References Cited

U.S. PATENT DOCUMENTS

| | | | |
|---|---|---|---|
| 6,747,631 B1 * | 6/2004 | Sakamaki | G01L 1/14 345/157 |
| 7,336,006 B2 * | 2/2008 | Watanabe | G06F 3/016 310/12.25 |
| 8,456,042 B2 * | 6/2013 | Dong | H02K 33/16 310/15 |
| 8,624,450 B2 * | 1/2014 | Dong | H02K 33/16 310/15 |
| 9,791,931 B2 * | 10/2017 | Tachiiri | G06F 3/0354 |
| 10,008,894 B2 * | 6/2018 | Mao | H02K 1/34 |
| 10,038,360 B2 * | 7/2018 | Wang | H02K 33/00 |
| 2009/0058199 A1 * | 3/2009 | Ito | H02K 41/031 310/12.06 |
| 2012/0153748 A1 * | 6/2012 | Wauke | H02K 33/16 310/25 |
| 2013/0193779 A1 * | 8/2013 | Kuroda | H02K 33/12 310/15 |

* cited by examiner

*Primary Examiner* — Alexander Talpalatski
(74) *Attorney, Agent, or Firm* — Na Xu; IPro, PLLC

(57) ABSTRACT

A vibration motor is provided. The vibration motor includes a shell, a vibrating component disposed in the shell, coils secured in the shell and elastic connectors which are used to support the vibrating component elastically. The vibrating component comprises a mass block, a first magnet steel assembly and a second magnet steel assembly received in the mass block. The coils comprise a first coil disposed opposite to the first magnet steel assembly and a second coil disposed opposite to the second magnet steel assembly. The driving force generated by the first magnet steel assembly and the first coil can drive the vibration motor to vibrate along a first direction, while the driving force generated by the second magnet steel assembly and the second coil can drive the vibration motor to vibrate along a second direction, wherein the first direction and the second direction intersects to each other.

15 Claims, 1 Drawing Sheet

VIBRATION MOTOR

FIELD OF THE DISCLOSURE

The present invention relates to a vibration motor, and in particular, relates to a double resonant vibration motor.

BACKGROUND

With the development of electronic technology, portable consumer electronic products are becoming more and more popular, such as mobile phones, handheld game consoles, navigation devices or handheld multimedia entertainment equipment etc. Such products generally employ vibration motors to give system feedbacks, such as mobile phone incoming call prompt, information prompt, navigation cues, vibrating feedback of the game console and the like. In view of its wide range of applications, the vibration motor is required to have good performance, long usage life and small size.

The vibration motor currently used in portable consumer electronic product generally includes a shell, a base which can form an accommodation space when assembled with the shell; and a single vibrating system received in the accommodation space. Because one vibrating system has only one inherent resonant frequency, the vibration motor with such traditional structure can only have one resonant frequency. If a terminal employing such vibration motor needs to have two resonant frequencies, it has to employ two vibration motors, which will increase the space usage for the vibration motors and is detrimental to the general tendency of miniaturization of the terminals.

Therefore, it is desired to provide a new vibration motor which can overcome the aforesaid problems.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and the embodiment thereof.

Figure 1:
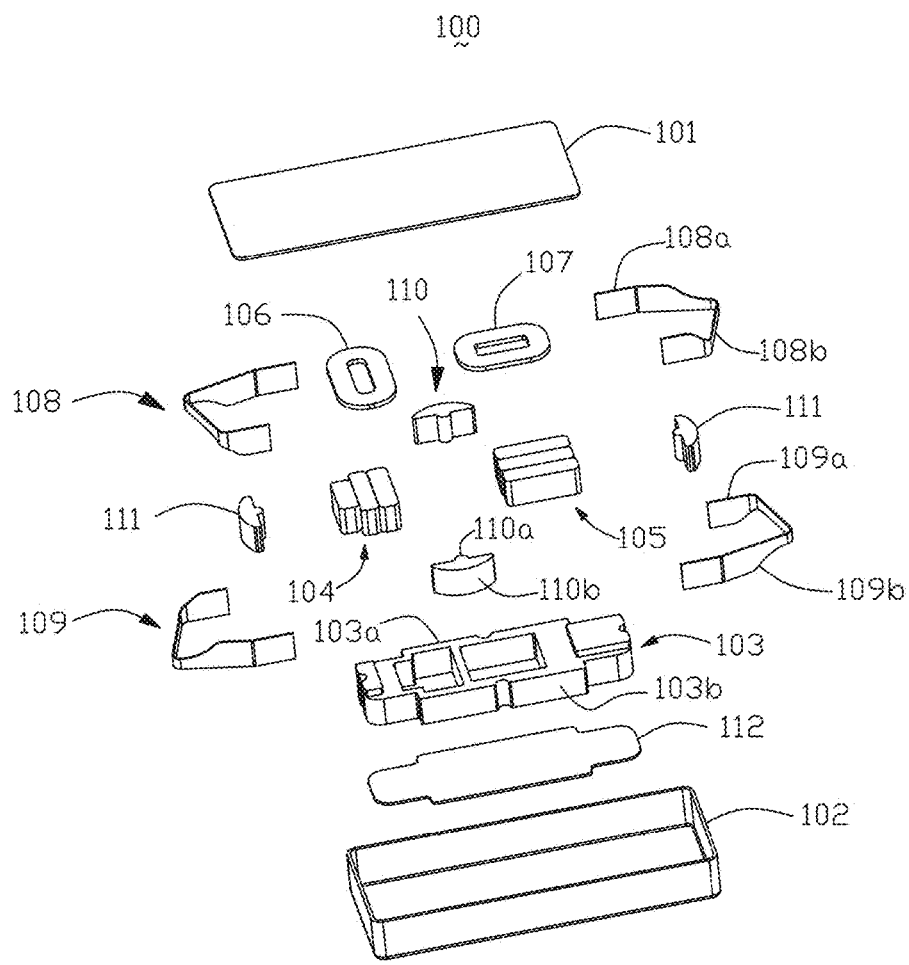
FIG. 1 is an exploded view showing a structure of a vibrating motor according to the present invention.
Figure 2:
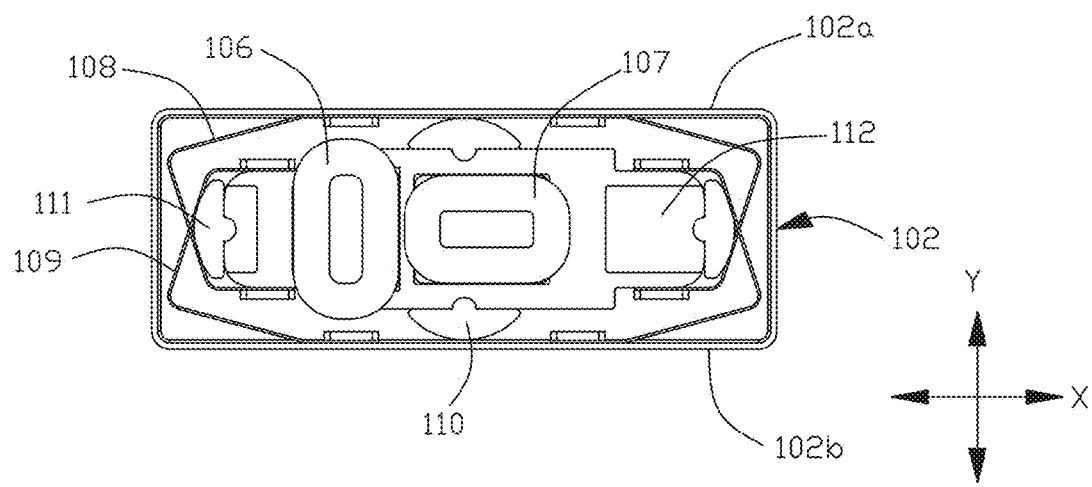
FIG. 2 a front view showing the vibration motor shown in FIG. 1 with a cover plate removed.

Referring to FIGS. 1-2, a vibration motor 100 comprises a shell, a vibrating component disposed in the shell, coils secured in the shell and elastic connectors which are used to support the vibrating component elastically. The shell comprises a casing 102 with one side open, and a cover plate 101 that can enclose an accommodation space with the casing 102. The casing 102 has a first side wall 102a and a second side wall 102b opposite to each other. Both of the elastic connectors and the vibrating component are contained in the accommodation space. The coils are contained in the accommodation space and are securely connected with the cover plate 101.

The vibrating component comprises a mass block 103, a first magnet steel assembly 104 and a second magnet steel assembly 105 received in the mass block 103 and a pole core 112 covered on the mass block 103. The mass block 103 has a first side face 103a near the first side wall 102a and a second side face 103b near the second side wall 102b. The first magnet steel assembly 104 and the second magnet steel assembly 102 each comprises three magnet blocks disposed in parallel. The magnetization directions of the first magnet steel assembly 104 and the second magnet steel assembly 105 are perpendicular to each other. The coils include a first coil 106 facing the first magnet steel assembly 104 and a second coil 107 facing the second magnet steel assembly 105. The driving force generated by the first magnet steel assembly 104 and the first coil 106 can cause the vibration motor 100 to vibrate along a first direction that is, the X direction in the drawing. The driving force generated by the second magnet steel assembly 105 and the second coil 107 can cause the vibration motor 100 to vibrate along a second direction that is, the Y direction in the drawing. The first direction X is perpendicular to the second direction Y.

When the first coil 106 is energized, the vibrating component will vibrate along the X direction at a resonant frequency f1, causing corresponding vibrating sense. When the second coil 106 is energized, the vibrating component will vibrate along the Y direction at a resonant frequency f2, causing corresponding vibrating sense. That is, the vibration motor 100 can provide double frequency resonance along two directions X and Y using one vibrating component. If the first coil 106 and the second coil 107 are energized simultaneously, the vibration motor 100 can work at two resonant frequencies at the same time. At this time, the vibration motor 100 can cause both the vibrating sense along the X direction and the vibrating sense along the Y direction without interfering with each other and thus give a special vibrating sense.

The elastic connectors comprise a pair of first elastic connectors 108 and a pair of second elastic connectors 109. Each of the first elastic connectors 108 has a first securing portion 108a connected with the first side wall 102a and a first connecting portion 108b extending from the first securing portion 108a and connected with the second side face 103b of the mass block 103. Each of the second elastic connectors 109 has a second securing portion 109a connected with the second side wall 102b and a second connecting portion 109b extending from the second securing portion 109a and connected with a side face 103a of the mass block.

The vibration motor 100 also comprises damping elements. The damping elements are disposed around the mass block 103 and include first damping elements 110 providing damping along the Y direction and second damping elements 111 providing damping along the X direction.

There are two first damping elements 110, disposed between the first side wall 102a and the first side face 103a of the mass block 103, and between the second side wall 102b and the second side face 103b of the mass block respectively. Each of the first damping elements 110 has an embedded portion 110a embedded in and snap-fitted with the mass block 103. There are gaps between the first side wall 102a or the second side wall 102b and the surfaces of the first damping elements 110 facing the first side wall 102a or the second side wall 102b. The gaps are generally about 0.1 mm. The purpose of the gaps is to avoid the friction between the first damping elements 110 and the side faces of the casing 102 to generate noise. The surfaces of the first damping elements 110 facing the first side wall 102a or the second side wall 102b are arc-shaped. Preferably, the latching positions between the first damping elements 110 and the mass block 103 are opposite to the second magnet steel assembly 105.

As can be seen in FIG. 2, the first connecting portion 108b and the second connecting portion 109b are crossed to each other and can form an accommodation space with one end of the mass block 103. The second damping element 111 is received in the accommodation space. The structure of the second damping element 111 is the same with that of the first damping element 110 in that each of them has an embedded portion embedded in the mass block 103 and an arc-shaped surface.

The first damping elements 110 and the second damping elements 111 can provide damping elements along the Y direction and the X direction respectively and can avoid the noise generated by the vibration motor 100 when vibrating in the two directions.

The vibration motor 100 of the present invention has one resonant frequency in each of the two different directions respectively. The two resonant frequencies not only can vibrate independently but also can vibrate simultaneously in order to achieve different vibrating senses. The vibration motor 100 of the present invention has simple structure and small size.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising a shell, a vibrating component disposed in the shell, coils secured in the shell and elastic connectors which are used to support the vibrating component elastically; wherein the vibrating component comprises a mass block, a first magnet steel assembly and a second magnet steel assembly received in the mass block; the coils comprise a first coil disposed opposite to the first magnet steel assembly and a second coil disposed opposite to the second magnet steel assembly; the driving force generated by the first magnet steel assembly and the first coil can drive the vibration motor to vibrate along a first direction, while the driving force generated by the second magnet steel assembly and the second coil can drive the vibration motor to vibrate along a second direction, wherein the first direction and the second direction intersects to each other.

2. The vibration motor of claim 1, wherein, the magnetization direction of the first magnet steel assembly is perpendicular to the first direction and the magnetization direction of the second magnet steel assembly is perpendicular to the second direction.

3. The vibration motor of claim 1, wherein, the magnetization direction of the first magnet steel assembly is perpendicular to the first direction and the magnetization direction of the second magnet steel assembly is perpendicular to the second direction.

4. The vibration motor of claim 1, wherein, the shell comprises a first side wall and a second side wall opposite to each other, the first direction is parallel to the extension direction of the first side wall and the second side wall, the first direction and the second direction are perpendicular to each other.

5. The vibration motor of claim 4, wherein, the elastic connectors are provided in pair, disposed at two ends of the mass block respectively so as to secure the mass block to the shell.

6. The vibration motor of claim 5, wherein, the elastic connectors comprises a first elastic connector and a second elastic connector; the first elastic connector is connected at one end with the first side wall of the shell and is connected at the other opposite end with the surface of the mass block facing the second side wall; the second elastic connector is connected at one end with the second side wall of the shell and is connected at the other opposite end with the surface of the mass block facing the first side wall.

7. The vibration motor of claim 6, wherein, the first elastic connector has the same structure as the second elastic connector.

8. The vibration motor of claim 6, wherein, both the first elastic connector and the second elastic connector have U-shaped structures.

9. The vibration motor of claim 6, wherein, the vibration motor also comprises several damping elements disposed around the mass block.

10. The vibration motor of claim 9, wherein, the damping elements comprises two first damping elements, the two first damping elements are disposed between the mass block and the first side wall, and between the mass block and the second side wall, symmetrically.

11. The vibration motor of claim 10, wherein, each of the first damping elements has an embedded portion embedded in the mass block and snap-fitted with the mass block; there are gaps between the first side wall or the second side wall and the surfaces of the first damping elements facing the first side wall or the second side wall.

12. The vibration motor of claim 11, wherein, the surfaces of the first damping elements facing the first side wall or the second side wall are arc-shaped.

13. The vibration motor of claim 11, wherein, the latching positions of the first damping elements and the mass block are opposite to the second magnet steel assembly.

14. The vibration motor of claim 10, wherein, the damping elements also comprises two second damping elements, the two second damping elements are disposed at two ends of the mass block symmetrically.

15. The vibration motor of claim 14, wherein, the first elastic connector and the second elastic connector are crossed to each other so that there is an accommodation space among the first elastic connector, the second elastic connector and the mass block, and the second damping element is disposed in the accommodation space.

* * * * *